United States Patent
Sharma et al.

(10) Patent No.: US 10,554,274 B2
(45) Date of Patent: Feb. 4, 2020

(54) METHOD AND SYSTEM FOR REGULATING ELECTRONIC MAGNETIC RADIATION FROM WIRELESS EQUIPMENT

(71) Applicant: Samsung Electronics Co., Ltd., Gyeonggi-do (KR)

(72) Inventors: Diwakar Sharma, Bangalore (IN); Prasad R Rao, Bangalore (IN); Tushar Vrind, Bangalore (IN)

(73) Assignee: Samsung Electronics Co., Ltd (KR)

( * ) Notice: Subject to any disclaimer, the term of this patent is extended or adjusted under 35 U.S.C. 154(b) by 340 days.

(21) Appl. No.: 15/344,968

(22) Filed: Nov. 7, 2016

(65) Prior Publication Data
US 2017/0134131 A1 May 11, 2017

(30) Foreign Application Priority Data
Nov. 6, 2015 (IN) .................. 6020/CHE/2015 PS

(51) Int. Cl.
| | | |
|---|---|---|
| *H04B 7/06* | (2006.01) | |
| *H04L 5/00* | (2006.01) | |
| *H04W 88/02* | (2009.01) | |
| *H04W 88/08* | (2009.01) | |

(52) U.S. Cl.
CPC .......... *H04B 7/0617* (2013.01); *H04L 5/0023* (2013.01); *H04W 88/02* (2013.01); *H04W 88/08* (2013.01)

(58) Field of Classification Search
CPC ... H04L 5/0048; H04L 5/0023; H04L 5/0053; H04B 7/0617; H04W 88/02; H04W 88/08
See application file for complete search history.

(56) References Cited

U.S. PATENT DOCUMENTS

| | | | |
|---|---|---|---|
| 8,996,054 B2 | 3/2015 | Kazmi | |
| 2009/0047998 A1* | 2/2009 | Alberth, Jr. ........... | H04W 52/42 455/562.1 |
| 2012/0147801 A1* | 6/2012 | Ho ...................... | H04W 52/365 370/311 |
| 2013/0252658 A1* | 9/2013 | Wilson ................ | H04W 52/146 455/522 |
| 2014/0187281 A1* | 7/2014 | Faraone .............. | H04W 52/288 455/522 |
| 2015/0085760 A1* | 3/2015 | Yamada ................ | H04W 24/10 370/329 |

(Continued)

OTHER PUBLICATIONS

"Radio Frequency Dangers, Do Cell Phones Hurt Your Head?" Cell Phone Safety Let's Talk Prevention http://www.cellphonesafety.org/health/radio.htm 2015 1/2.

(Continued)

*Primary Examiner* — Mandish K Randhawa
(74) *Attorney, Agent, or Firm* — The Farrell Law Firm, P.C.

(57) ABSTRACT

A system, transceiver, computer programming product, and method of regulating transmission of a packet from a transceiver are provided. The method includes measuring, by the transceiver, the electronic magnetic radiation (EMR) for an allocated uplink (UL) grant at a transmission time interval (TTI), detecting, by the transceiver, if the measured EMR exceeds an EMR threshold; and regulating, at the transceiver, a transmission of the packet to reduce the EMR.

18 Claims, 12 Drawing Sheets

(56) References Cited

U.S. PATENT DOCUMENTS

2015/0341869 A1* 11/2015 Sen .................. H04W 52/34
455/522

OTHER PUBLICATIONS

"Specific Absorption Rate (SAR) for Cell Phones: What It Means for You" https://www.fcc.gov/consumers/guides/specific-absorption-rate-sar-cell-phones-what-... Nov. 4, 2015, 1/2.

Beginners Guide to going Wireless-Are Wireless Signals Dangerous to your Health Free computer Tutorials, http://www.homeandlearn.co.uk/BC/bcs6p3C.html, 2015, 1/3.

Know How Safe is Your Mobile Truly You Can Do It, Oct. 13, 2014 http://youcandoit.co.in/know-how-safe-is-your-mobile-truly/ Oct. 13, 2014, 1/5.

Cell Phones, Cancers and Brain Tumors. Do cell phones cause Cancer? What is the Real Story?, Environmental, Health and Safety Online, Apr. 18, 2015, 1/16.

* cited by examiner

RVn+1 will be send in next occasion, if
$T_x$ is missed for HARQ process due to SAR ACK/NACK decision will be taken based on
transmitted UL data for HARQ process

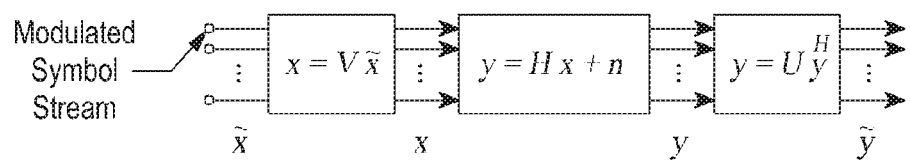
FIG.8
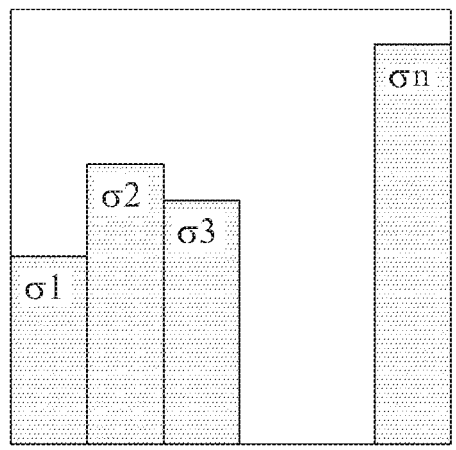      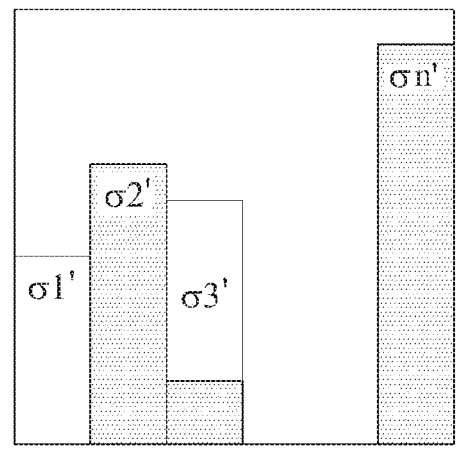
FIG.9A           FIG.9B

METHOD AND SYSTEM FOR REGULATING ELECTRONIC MAGNETIC RADIATION FROM WIRELESS EQUIPMENT

PRIORITY

This application claims priority under 35 U.S.C. § 119(a) to an Indian Provisional Patent Application filed on Nov. 6, 2015 in the Indian Intellectual Property Office and assigned Serial No. 6020/CHE/2015 (PS), the entire disclosure of which is incorporated herein by reference.

BACKGROUND

1. Field of the Disclosure

The present disclosure relates generally to a method and system for regulating electronic magnetic radiation (EMR) from wireless equipment, and more particularly, to a method and system for reducing EMR from wireless equipment.

2. Description of the Related Art

Generally, an influence of EMR from a mobile terminal is rapidly increasing. The primary reason is due to a densification of wireless equipment and dense deployment of base stations (evolved node base stations (BSs or eNBs)) in order to meet the capacity, demand, required by an increasing number of wireless equipment (for example, electronic device(s), user equipment (UE), cellular phones, multiple electronic devices, receivers, transmitters, transceivers, etc.). Accordingly, an interest and concern about a relationship between human health and EMR from cellular phones is also increasing.

An electronic device, in close proximity to a human body, uses radio frequency (RF) energy to emit EMR. An electronic device using RF energy operates at low power (e.g. less than 1 watt). Radiation called "ionizing radiation" carries enough energy to free electrons from atoms or molecules, thereby ionizing the electrons which may then be absorbed by the human body (i.e., in the tissues of the human body) and break molecules apart, such as gamma rays and X-rays, which are prone to cause severe damage (e.g. cancer) to humans. Further, an electronic device and its antenna (the source of radiation) when held close to the head may cause a significant amount of issues pertaining to human health due to ionizing radiation. Issues such as, for example, sleeping disorders, headaches, and neurological problems. Resources claim that "radio wave sickness" includes multiple sclerosis, depression, autism, and a slew of other common ailments.

National and international organizations have defined a reference of specific absorption rate (SAR) for an electronic device (for example, an electronic device of a wireless equipment). In general, SAR is an absorption power of unit mass, which is absorbed into the human body if the human body is exposed to EMR emitted by an electronic device. SAR in the human body (or any living body) is in proportion to the square of electric field intensity. Thus, each and every individual is an active or a passive user of wireless equipment which has some impact due to SAR. Wearable health devices could reverse the potential health benefit of wearing health devices due to SAR.

SUMMARY

An aspect of the present disclosure is to provide a mechanism for regulating the transmission of a packet from a transceiver to reduce EMR.

Another aspect of the present disclosure is to provide a mechanism for measuring, by a transceiver, EMR for an allocated uplink (UL) grant at a transmission time interval (TTI).

Another aspect of the present disclosure is to provide a mechanism for detecting, by a transceiver, that measured EMR exceeds an EMR threshold.

Another aspect of the present disclosure is to provide a mechanism for regulating, at a transceiver, the transmission of a packet to reduce EMR.

Another aspect of the present disclosure is to provide a mechanism for adjusting spatial direction and applied power of at least one antenna based on measured EMR (e.g., when EMR exceeds an EMR threshold).

Another aspect of the present disclosure is to provide a mechanism for limiting transmission of packets from a transceiver based on measured EMR for UL allocation.

Another aspect of the present disclosure is to provide a mechanism to circumvent/mitigate an adverse effect of EMR based on feedback from wireless equipment.

Another aspect of the present disclosure is to provide a mechanism for adjusting power allocation to a lower eigen direction as per water filling criteria.

Another aspect of the present disclosure is to regulate transmission of a packet by muting the packet transmission for an allocated UL grant for at least one TTI based on measured EMR.

Another aspect of the present disclosure is to regulate transmission of a packet to reduce EMR by adjusting applied power based on measured EMR and transmitting the packet based on the adjusted applied power.

Another aspect of the present disclosure is to adjust applied power based on measured EMR by quantizing measured EMR into a plurality of EMR indexes and adjusting the applied power corresponding to the at least one EMR index for the packet transmission.

Another aspect of the present disclosure is to adjust applied power based on measured EMR by quantizing the measured EMR into a plurality of EMR indexes; determining a bundle size corresponding to at least one EMR, wherein the bundle size is shared in association with activation time to trigger a TTI bundling and adjusting applied power based on the bundle size for a packet transmission, wherein adjusting the applied power includes power adaption based on the measured EMR, TTI bundling triggered by a transceiver and TTI bundling triggered by an eNB.

Another aspect of the present disclosure is to trigger, by a transceiver (e.g., an electronic device), a TTI bundling based on a measured EMR index by determining a TTI bundle size based on the measured EMR index and transmitting, by the transceiver, the TTI bundle size with a receiver (e.g., a BS/eNB) in accordance with an activation time to trigger the TTI bundling.

Another aspect of the present disclosure is to trigger, by an eNB, a TTI bundling based on a measured EMR index by receiving an EMR index from a transceiver, triggering, by the eNB, the TTI bundling and transmit, by the eNB, a TTI bundle size to the transceiver in accordance with an activation time, wherein the TTI bundle size is determined based on the EMR index received to the eNB.

Another aspect of the present disclosure is to regulate transmission of a packet from a transceiver to reduce EMR by adjusting a spatial direction of at least one antenna based on measured EMR and transmitting the packet based on the adjusted spatial direction of the at least one antenna.

Another aspect of the present disclosure is to adjust a spatial direction of at least one antenna using a phase shifter, wherein each of the at least one antenna transmits the same waveform with a phase difference.

Another aspect of the present disclosure is to adjust a spatial direction of at least one antenna for multiple-input and multiple-output (MIMO) using a digital pre coder.

Another aspect of the present disclosure is to adjust a spatial direction of at least one antenna for MIMO using a hybrid (e.g., an analog and a digital) pre coder.

Another aspect of the present disclosure is to adjust a spatial direction of at least one antenna for MIMO using a hybrid pre coder with multiple RF chains.

Another aspect of the present disclosure is to adjust a spatial direction of at least one antenna for an EMR index based on a proximity level.

Another aspect of the present disclosure is to adjust a spatial direction and an applied power of at least one antenna for a single user and a multiple user based on an EMR index by determining a lower eigen direction from a plurality of eigen directions for the EMR index and adjusting power allocation to the lower eigen direction as per water filling criteria.

Another aspect of the present disclosure is to regulate transmission of a packet from a transceiver to reduce EMR by quantizing measured EMR into a plurality of EMR indexes, measuring by the transceiver a power head room (PHR) based on the plurality of EMR indexes and broadcasting by the transceiver a PHR measurement report.

Another aspect of the present disclosure is to measure by a first transceiver an EMR for an UL grant at a TTI; detect that the measured EMR is within an EMR threshold and broadcast, by the first transceiver, the measured EMR to at least one second transceiver.

In accordance with an aspect of the present disclosure, a method of regulating transmission of a packet from a transceiver is provided. The method includes measuring, by the transceiver, the electronic magnetic radiation (EMR) for an allocated uplink (UL) grant at a transmission time interval (TTI), detecting, by the transceiver, if the measured EMR exceeds an EMR threshold; and regulating, at the transceiver, a transmission of the packet to reduce the EMR.

In accordance with another aspect of the present disclosure, a system for regulating transmission of a packet is provided. The system includes a first transceiver; at least one second transceiver in proximity to the first transceiver, wherein the first transceiver is configured to measure an electronic magnetic radiation (EMR) for an allocated uplink (UL) grant at a transmission time interval (TTI); detect if the measured EMR exceeds an EMR threshold; and broadcast the measured EMR to the at least one second transceiver in proximity to the first transceiver to reduce the EMR, wherein the at least one second transceiver is configured to regulate transmission of the packet to reduce the EMR.

In accordance with another aspect of the present disclosure, a transceiver for regulating transmission of a packet is provided. The transceiver includes a control unit; and a memory unit communicatively coupled to the control unit, wherein the control unit is configured to measure an electronic magnetic radiation (EMR) for an allocated uplink (UL) grant at a transmission time interval (TTI); detect if the measured EMR exceeds an EMR threshold; and regulate a transmission of the packet to reduce the EMR.

In accordance with another aspect of the present disclosure, a computer program product comprising computer executable program code recorded on a non-transitory computer readable storage medium, said computer executable program code when executed causing a method to be executed. The method including measuring an electronic magnetic radiation (EMR) for an allocated uplink (UL) grant at a transmission time interval (TTI); detecting if the measured EMR exceeds an EMR threshold; and broadcasting the measured EMR to at least one second transceiver in proximity of a first transceiver to reduce the EMR, wherein the at least one second transceiver is configured to regulate a transmission of a packet to reduce the EMR.

BRIEF DESCRIPTION OF THE DRAWINGS

The above and other aspects, features, and advantages of the present disclosure will be more apparent from the following detailed description, taken in conjunction with the accompanying drawings, un which:

FIG. 8 a block diagram of a transceiver regulating transmission of a packet by adjusting a spatial direction and applied power for MIMO with a digital pre-coder, according to an embodiment of the present disclosure;

FIGS. 9A-9B illustrate a transceiver regulating a transmission of a packet to reduce EMR by adjusting a spatial direction and applied power for MIMO with a hybrid pre-coder, according to an embodiment of the present disclosure;

DETAILED DESCRIPTION OF EMBODIMENTS OF THE PRESENT DISCLOSURE

Figure 1:
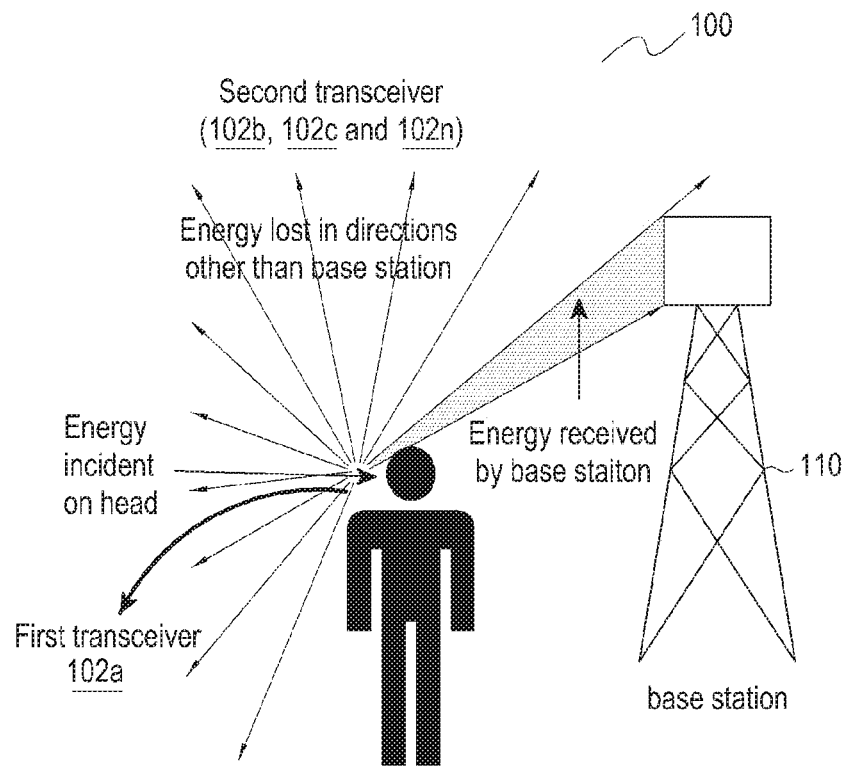
FIG. 1 illustrates a system including a first transceiver, one or more second transceiver(s), and a base station for regulating transmission of packet from a transceiver to reduce an EMR, according to an embodiment of the present disclosure.

The embodiments of the present disclosure herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. In addition, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples are not intended to be construed as limiting the scope of the present disclosure, as defined by the appended claims and their equivalents.

The terms "first" and "second" are used for illustrative purpose only and are not intended to limit the scope of the present disclosure.

The embodiments herein disclose a system for regulating transmission of a packet from a transceiver to reduce EMR. The system includes a first transceiver and one or more second transceiver(s) in proximity to the first transceiver, wherein the first transceiver is configured to measure EMR for an allocated UL grant at a TTI. Further, the first transceiver is configured to detect if the measured EMR exceeds an EMR threshold. Furthermore, the first transceiver is configured to broadcast the measured EMR to the one or more second transceiver(s), in proximity of the first transceiver, to reduce EMR, wherein the one or more second transceiver(s) are configured to regulate transmission of the packet to reduce EMR.

The embodiments herein disclose a method of regulating transmission of a packet from a transceiver to reduce EMR. The method includes measuring, by the transceiver, EMR for an allocated UL grant at a TTI. Further, the method includes detecting, by the transceiver, if the measured EMR exceeds an EMR threshold. Furthermore, the method includes regulating, at the transceiver, the transmission of the packet to reduce EMR.

In an embodiment, the depth of EMR, from a transceiver, absorbed by the human body, more specifically the human brain, has been decided by a SAR distribution authority (w/kg). A governing authority may be responsible for setting a limit of a transmission of EMR from a single BS and from a single transceiver (or electronic device, or wireless equipment) in order to minimise an SAR influence towards human health. However, due to an increased densification of wireless network systems (increased number of wireless equipment) transmission of EMR from a plurality of BSs and from a plurality of the transceiver(s) may exceed the limit set by the governing authority.

Thus, an SAR (due to high EMR) is one of the considerations for restricting a transceiver to transmit at high power levels, as the impact on human health may be adverse. According to an existing mechanism, regulating EMR (followed and defined by the SAR authority) is limited per transceiver. As the number of devices increase in the market (e.g., an increase in smartphone and wearable devices), there may be a higher impact of EMR due to the one or more neighboring transceiver(s) and overall transmissions/receptions in the proximity. Thus, it is important to consider SAR holistically.

Unlike conventional methods and systems, an embodiment of the present disclosure may be utilized to adjust transmission temporally or spatially to alleviate a situation when it is detected that EMR is higher than allowed levels.

Unlike conventional methods and systems, the present disclosure may be utilized to minimize a SAR by reducing EMR emitted from one or more BSs and radiation emitted from one or more transceiver(s), by scheduling a transmission of packets for both UL and DL and by selecting an eigen direction and power allocation for a single user system (SU-MIMO) and a multi user system (MU-MIMO).

Referring now to the drawings, and more particularly to FIGS. 1 through 12, where similar reference characters denote corresponding features consistently throughout the figures, there are shown embodiments of the present disclosure.

FIG. 1 illustrates a system 100 including a first transceiver 102a, one or more second transceiver(s) 102b, 102c and 102n and one or more receiver(s) 110 (hereinafter receiver or BS 110), according to an embodiment of the present disclosure. The first transceiver 102a and the second transceiver(s) 102b, 102c and 102n communicates with the receiver 110, and with each other (e.g. first transceiver 102a communicating with second transceiver(s) 102b, 102c and 102n or vice-versa) for transmitting packets thereof.

The first transceiver 102a may emit EMR (for example, gamma rays, X-rays, radio waves, etc.) during/along-with the transmission of packets. Further, the second transceiver(s) 102b, 102c and 102n in proximity to the first transceiver 102a also emits radiation (i.e., EMR) during/along-with the transmission of the packets associated therewith.

The radiation emitted by the first transceiver 102a and the second transceiver(s) 102b, 102c and 102n in proximity to the first transceiver 102a may get scattered in the wireless network system and absorbed by a human being while in proximity to the emitted radiation(s).

In an embodiment of the present disclosure, the first transceiver 102a and the second transceiver(s) 102b, 102c and 102n) may be for example, a wireless equipment, a UE, a BS, a mobile station (MS), a mobile phone, a mobile terminal, a smart phone, a personal digital assistant (PDA), a tablet, a phablet, or any other electronic device capable of transmitting/receiving packets.

In an embodiment of the present disclosure, the receiver 110 may be for example, the first transceiver 102a and the second transceiver(s) 102b, 102c and 102n may be for example, a wireless equipment, a UE, a BS, an MS, a mobile phone, a mobile terminal, a smart phone, a PDA, a tablet computer, a phablet, or any other electronic device capable of transmitting/receiving packets.

In an embodiment of the present disclosure, the first transceiver 102a may be configured to measure EMR for an allocated UL grant at a TTI. EMR may be emitted by the first transceiver 102a during transmission of packets.

Further, the first transceiver 102a may be configured to detect if a measured EMR exceeds an EMR threshold. Furthermore, the first transceiver 102a may be configured to broadcast the measured EMR to the second transceiver(s) 102b, 102c and 102n in proximity to reduce EMR, wherein the second transceiver(s) 102b, 102c and 102n are configured to regulate transmission of a packet to reduce EMR.

Figure 6:
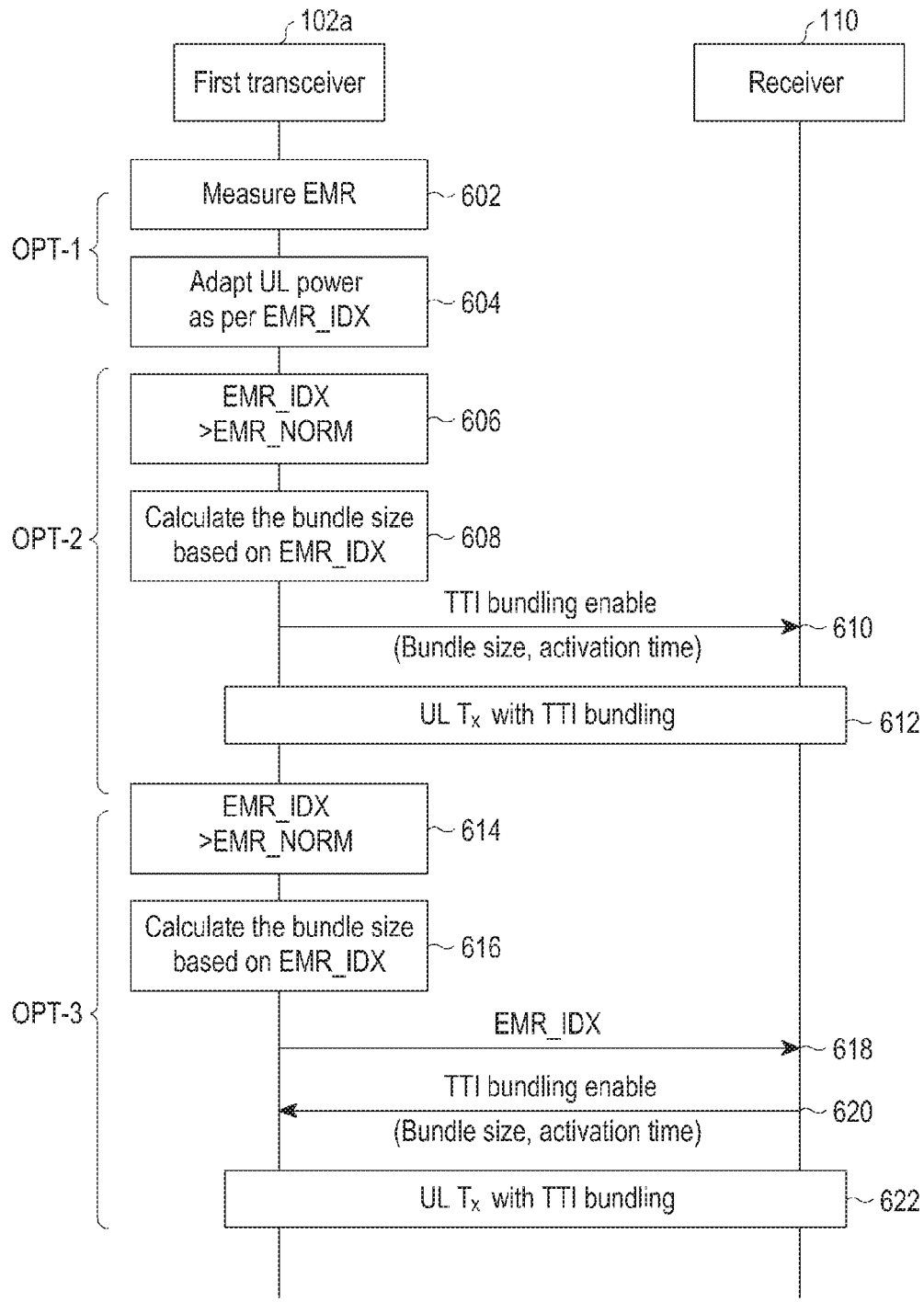
FIG. 6 is a sequence diagram for regulating transmission of a packet from a first transceiver by adjusting applied power based on a measured EMR, according to an embodiment of the present disclosure.
Figure 7A:
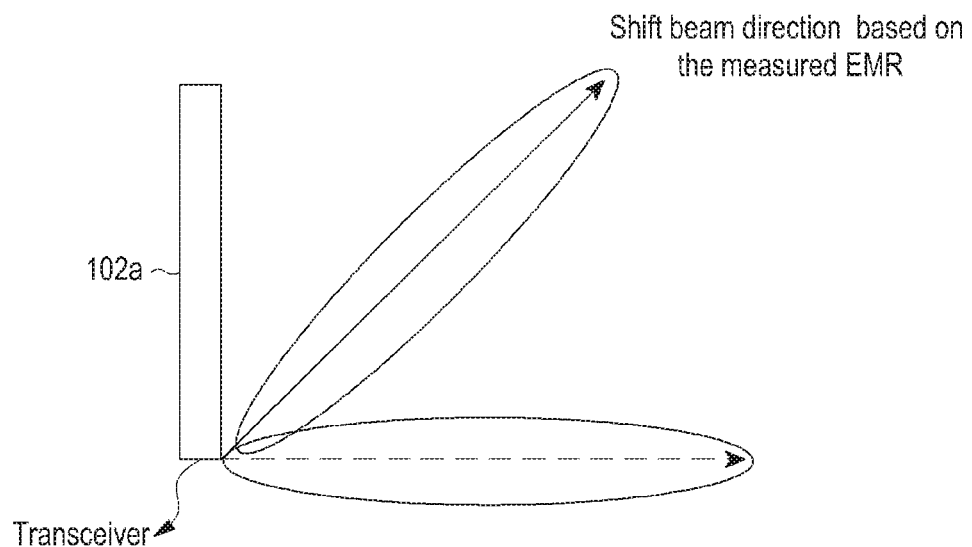
FIGS. 7A-7B illustrates a transceiver regulating transmission of a packet by adjusting a spatial direction and applied power of one or more antenna(s) based on proximity levels, according to an embodiment of the present disclosure.
Figure 7B:
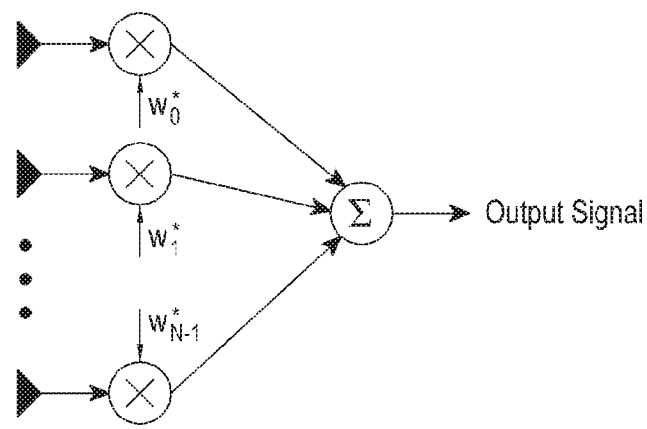

In an embodiment of the present disclosure, regulating a transmission of a packet, by the second transceiver(s) 102b, 102c and 102n, includes one of muting the packet transmission for an allocated UL grant for at least one TTI based on a received measured EMR report from the first transceiver 102a (as described below with reference to FIGS. 4-5), adjusting applied power based on the received measured EMR and transmitting the packet based on the adjusted power (as described below with reference to FIG. 6), adjusting a spatial direction of at least one antenna based on the received measured EMR, and transmitting the packet based on the adjusted spatial direction of the at least one antenna (as described below with reference to FIGS. 7A-7B).

In an embodiment of the present disclosure, the first transceiver 102a is configured to measure EMR for an allocated UL grant at a TTI. Further, the first transceiver 102a is configured to detect if the measured EMR is within an EMR threshold. Furthermore, the first transceiver 102a may be configured to broadcast the measured EMR to the second transceiver(s) 102b, 102c and 102n.

Referring to FIG. 1, the system 100 is shown, but it is to be understood that the present disclosure is not limited thereto. In an embodiment of the present disclosure, the system 100 may include a fewer or a greater number of components. Further, the labels or names of the components are used only for illustrative purpose and is not intended to limit the scope of the present disclosure. One or more components may be combined to perform the same or a substantially similar function in the system 100. Further, the operations may be interchangeably performed by the first transceiver 102a and the second transceiver(s) 102b, 102c and 102n.

Figure 2:
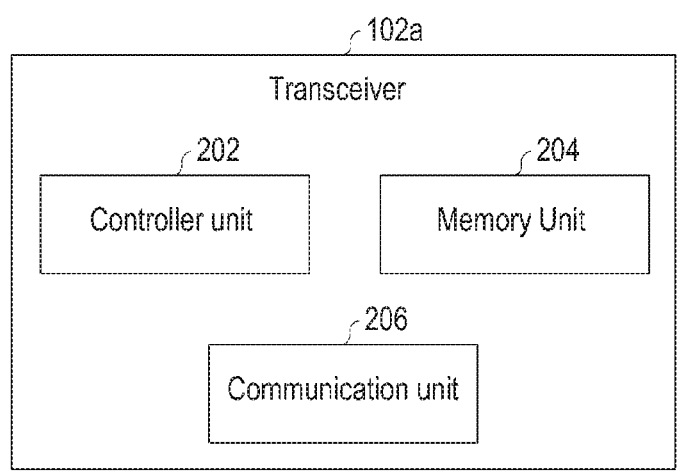
FIG. 2 is a block diagram of a transceiver for regulating transmission of a packet to reduce EMR, according to an embodiment of the present disclosure.

Referring to FIG. 2, various units of the first transceiver 102a for regulating the transmission of a packet are shown, according to an embodiment of the present disclosure. The first transceiver 102a may include, a control unit 202, a memory unit 204 communicatively coupled to the control unit 202 (or controller), and a communication unit 206 communicatively coupled to the memory unit 204.

The control unit 202 is configured to measure EMR for an allocated UL grant at a TTI (or at a defined periodicity). Further, the control unit 202 is configured to detect if the measured EMR exceeds an EMR threshold and regulate the transmission of a packet to reduce EMR thereof.

Further, the control unit 202 may be configured to regulate transmission of a packet by muting packet transmission for an allocated UL grant for one or more TTI based on a measured EMR. Further, the control unit 202 may be configured to regulate transmission of a packet by adjusting an applied power based on a measured EMR and transmitting the packet based on the adjusted applied power.

Adjusting an applied power based on a measured EMR by the control unit 202 includes quantizing a measured EMR into a plurality of EMR indexes (hereinafter "EMR_IDX") and adjusting an applied power corresponding to at least one EMR index for packet transmission. In an embodiment of the present disclosure, quantizing includes rounding and truncation of an input value associated with a measured EMR. For example, if an input value is one of a plurality of real numbers, the quantization process thus replaces each real number with an approximation from a finite set of discrete values (levels), which is necessary for storage and processing by numerical methods. Thus, the EMR_IDX may include a finite set of discrete values.

Further, adjusting an applied power based on a measured EMR by the control unit 202 includes determining a bundle size corresponding to at least one EMR, wherein the bundle size is shared in association with the activation time to trigger the TTI bundling, and adjusting applied power based on the bundle size for the packet transmission.

Further, an embodiment for adjusting applied power based on a measured EMR by the control unit 202 is described below with reference to FIG. 6.

For example, if the control unit 202 determines that a measured EMR exceeds an EMR threshold thereof the control unit 202 may therefore limit an applied power of the first transceiver 102a required during the transmission of packet. Thus, by limiting the applied power by scheduling the applied power based on a bundle size reduces EMR (i.e., SAR absorption).

In an embodiment of the present disclosure, the control unit 202 may be configured to regulate transmission of a packet to reduce EMR by adjusting spatial direction of at least one antenna based on a measured EMR and transmitting the packet based on the adjusted spatial direction of at least one antenna, as described below with reference to FIG. 6.

For example, adjusting a spatial direction of an antenna includes shifting a beam direction of the first transceiver 102a in order to reduce energy lost in directions other than BS 110.

Further, the control unit 202 may be configured to broadcast a measured EMR to the second transceiver(s) 102b, 102c and 102n (e.g., in proximity to the first transceiver (102a) to reduce EMR. The second transceiver(s) 102b, 102c and 102n may be configured to regulate transmission of a packet, to reduce EMR, based on an EMR measurement received from the control unit 202 of the first transceiver 102a.

Furthermore, the control unit 202 may be configured to measure an EMR for an UL grant at a TTI. Further, the control unit 202 may be configured to detect that a measured EMR is within an EMR threshold and broadcast the measured EMR to the second transceiver(s) 102b, 102c and 102n in proximity to the first transceiver 102a.

FIG. 2 shows units of the first transceiver 102a but the present disclosure is not limited thereto. In an embodiment of the present disclosure, the first transceiver 102a may include fewer or a greater number of units. Further, the names of the units are used only for an illustrative purpose, but the present disclosure is not limited thereto. One or more units may be combined to perform the same or substantially similar function in the first transceiver 102a.

Figure 3:
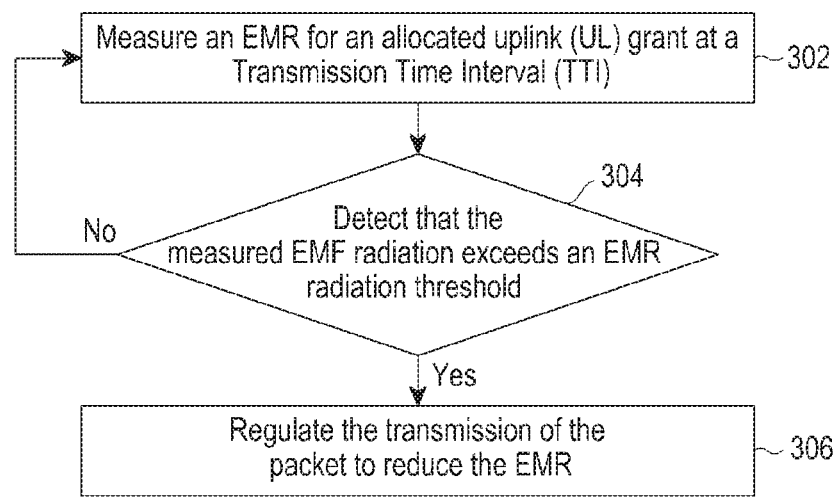
FIG. 3 is a flowchart of a method of regulating transmission of a packet from a transceiver to reduce EMR, according to an embodiment of the present disclosure.

FIG. 3 is a flowchart of a method of regulating transmission of a packet from the first transceiver 102a to regulate EMR, according to an embodiment of the present disclosure. At step 302, the method includes measuring EMR for an allocated UL grant at a TTI. In an embodiment of the present disclosure, the method allows the control unit 202 to measure EMR for the allocated UL grant at the TTI.

At step 304, the method includes detecting that the measured EMR exceeds an EMR threshold. In an embodiment of the present disclosure, the method enables the control unit 202 to detect if the measured EMR exceeds an EMR threshold.

If the measured EMR exceeds the EMR threshold then, at step 306, the method regulates the transmission of the packet to reduce EMR.

If the measured EMR does not exceed the EMR threshold then the control unit 202 may be configured to return to step 302.

The various actions, acts, blocks, steps, or the like in the method of the flowchart of FIG. 3 may be performed in the order presented, in a different order or simultaneously. Further, in an embodiment of the present disclosure, some of the actions, acts, blocks, steps, or the like may be omitted, added, modified, skipped, or the like without departing from the scope of the present disclosure.

Figure 4:
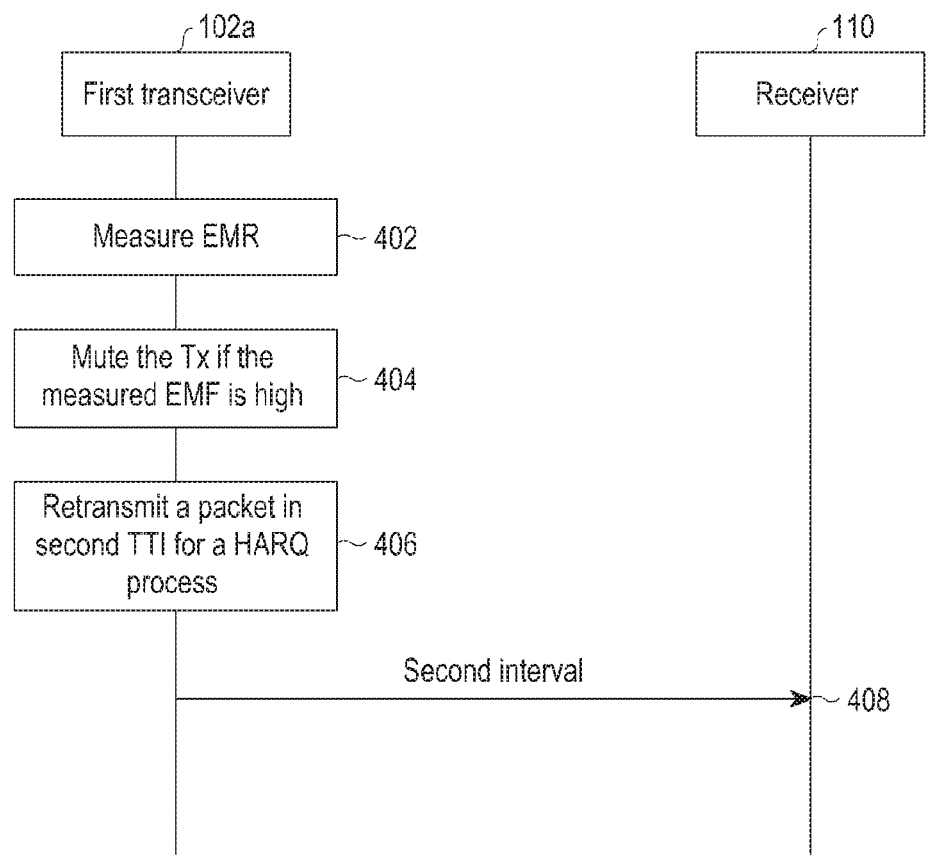
FIG. 4 is a sequence diagram of steps in which a transmission of a packet, from a first transceiver, is muted to reduce EMR, according to an embodiment of the present disclosure.

FIG. 4 is a sequence diagram of steps in which a transmission of a packet (e.g., a data packet) from the first transceiver 102a is muted to reduce EMR, according to an embodiment of the present disclosure. In this case, the receiver 110 may be, for example, the second transceiver(s) 102b, 102c and 102n or a BS.

The first transceiver 102a measures EMR during the transmission of the packets at step 402. If the first transceiver 102a determines that the measured EMR exceeds an EMR threshold, then the first transceiver 102a may be configured to mute a transmission (Tx) of the packets at step 404.

Further, the first transceiver 102a may retransmit the packets in a second TTI for a hybrid automatic repeat request (HARQ) process at step 406, where data packets may be missed due to high EMR constraints.

Figure 5A:
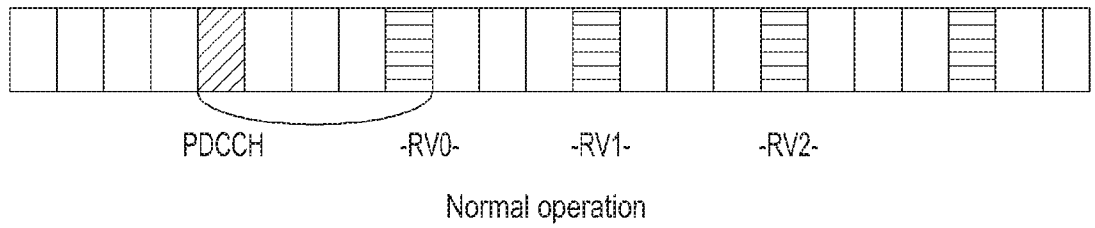
FIGS. 5A-5C each illustrate a message format for limiting transmission of a packet based on measured EMR for UL allocation, according to an embodiment of the present disclosure.
Figure 5B:
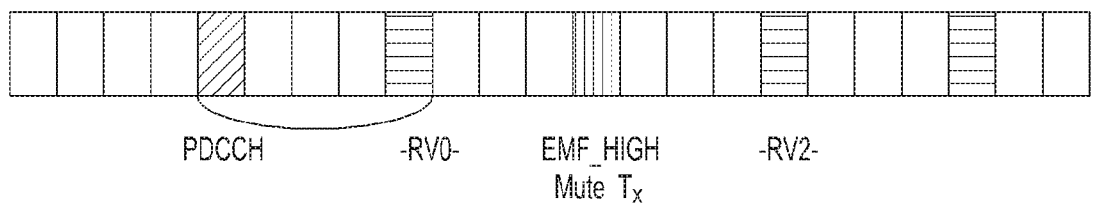
Figure 5C:
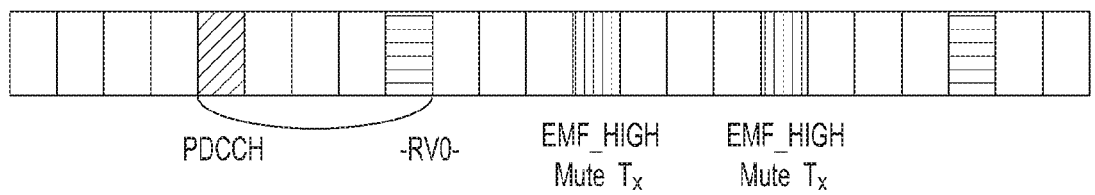

FIGS. 5A-5C each illustrate a message format (e.g., a terminal of the first transceiver 102a) for limiting transmission based on a measured EMR for UL allocation, according to an embodiment of the present disclosure. FIG. 5A illustrates a normal operation where the first transceiver 102a receives a physical downlink control channel (PDCCH) signaling sent by the receiver 110 (where the receiver 110 may be, for example, a BS).

An UL transmission may include a transmission and a retransmission of packets. An UL grant may be used to indicate transmission resources of the UL, which are included in PDCCH signaling. The first transceiver 102a may be configured to measure EMR per scheduling interval/ at the defined periodicity. If the first transceiver 102a determines that a measured EMR exceeds an EMR threshold for a given TTI for a scheduling interval, then the first transceiver 102a may be configured to mute a transmission for the allocated UL grant to reduce EMR.

PDCCH signaling may include HARQ related information such as redundancy version (RV), for example, RV0, RV1 and RV2 as shown in the FIG. 5A. If the first transceiver 102a misses a transmission in a specific TTI/scheduling interval, due to EMR constraints, then, the first transceiver 102a may be configured to transmit the RV1 as retransmitted "RVn+1" in a subsequent UL transmission as shown in the FIG. 5B.

In addition, a transmission may be muted for more than one transmission interval based on a measured EMR_IDX. If the first transceiver 102a misses a transmission in a specific TTI/scheduling interval, due to EMR constraints, then, the first transceiver 102a transmits the RVn+1 and RVn+2 in the second TTI for the HARQ process as shown in the FIG. 5C.

The BS 110 may send an ACK/NACK, only with received Tx data for an HARQ process.

Further, due to a mute transmission at Tx, the BS 110 may not receive RV as per an HARQ process. Thus, according to an embodiment of the present disclosure, the BS 110 may not apply incremental RV, if it does not receive a transmission from the first transceiver 102a (or from the second transceiver(s) 102b, 102c and 102n). The BS 110 may apply incremental redundancy if the BS 110 received an RV to decode an HARQ packet for a given HARQ process.

Further, feedback from the first transceiver 102a/second transceiver(s) 102b, 102c and 102 to the BS 110 may communicated through an index. The raw values (EMR_VAL), if they do not provide a reasonable impact on the decision, do not contribute to performing the adaptive instructions. Such values require a greater number of bits, hence may be a bad choice for the feedback operation. Table 1 below illustrates an EMR_IDX and an EMR_VAL (W/kg) (i.e., SAR_VAL (W/Kg)). Thus, it is desirable to quantize these values in indexes and then EMR_IDX (i.e., SAR_IDX) is fed back to a peer entity.

TABLE 1

| (EMR_IDX) | (EMR_VAL) |
|---|---|
| 9 | 2.6 |
| 8 | 2.4 |
| 7 | 2.2 |
| 6 | 2 |
| 5 | 1.8 |
| 4 | 1.6 |
| 3 | 1.4 |
| 2 | 1.2 |
| 1 | 1 |
| 0 | Less than 1 |

FIG. 6 is a sequence diagram for regulating transmission of a packet from the first transceiver 102a by adjusting applied power based on a measured EMR, according to an embodiment of the present disclosure. For example, the receiver 110 may be a BS.

Referring to FIG. 6, the first transceiver 102a (or, the second transceiver(s) 102b, 102c and 102) measures EMR during the UL transmission at step 602. Power adaptation at step 604 is based on a plurality of measured EMR indexes (EMR_IDX). In this case, if the measured EMR_IDX exceeds the EMR threshold (e.g., EMR_IDX>EMR_NORM) at step 606 then, the first transceiver 102a may adapt the power as per the quantized value for the measured EMR, as shown in option 1 (OPT-1).

For example, the aforementioned embodiment of the present disclosure resembles a UL coverage scenario, wherein the first transceiver 102a becomes power limited due to UL coverage, however, in this embodiment the first transceiver 102a becomes power limited due to an EMR constraint.

Further, in option 2 (OPT-2), the first transceiver 102a is configured to calculate the bundle size based on the EMR_IDX at step 608 and trigger at step 610 TTI bundling as specified in the third generation partnership project (3GPP). The triggering is defined as per the 3GPP for TTI bundling based on measurement reports, however, in an embodiment of the present disclosure, the TTI bundling is triggered based on EMR_IDX (new trigger). Thus, the first transceiver 102a transmits the UL with the TTI bundling at step 612.

Once the first transceiver 102a triggers TTI bundling and transmits a bundle size and activation time to the receiver 110 (e.g., a BS), then at the activation time, the receiver 110 should be ready to accept the bundled packet as per a 3GPP procedure. As per the 3GPP defined TTI bundling procedure, the first transceiver 102a is configured to transmit all RVs of the packet for an HARQ process. The receiver 110 receives and generates an HARQ_NACK/HARQ_ACK only after processing a bundled packet, i.e., after four long term evolution (LTE) sub frames (1 ms sub frames). After receiving an HARQ_NACK, the first transceiver 102a is configured to generate (4 LTE sub frames) and transmit the bundled packet, as per the 3GPP procedure.

Further, in option 3 (OPT-3), the first transceiver 102a transmits the EMR_IDX to the BS 110 at step 618, once the first transceiver 102a identifies at step 614 that the EMR_IDX exceeds the EMR_NORM (e.g., an EMR threshold). The first transceiver 102a calculates at step 616 the bundle size based on the EMR_IDX. The first transceiver 102a broadcasts at step 618 the EMR_IDX to the receiver 110. After receiving the EMR_IDX, the receiver 110 may be configured to trigger at step 620 the TTI bundling and share bundle size with the first transceiver 102a in association with an activation time. The first transceiver 102a may determine a bundle size based on the EMR_IDX reported to the receiver 110. Thus, the first transceiver 102a transmits at step 622 a UL with a given TTI bundling.

In an embodiment of the present disclosure, the first transceiver 102a may adjust an applied power for a UL transmission using power head room (PHR) reporting. The PHR is a mechanism to inform (or indicate) capability information of the first transceiver 102a to the receiver 110, the capability information may include whether or not the first transceiver 102a can transmit packets at a higher transmission power (i.e., indicating the amount of relative transmission power available in the first transceiver 102a).

Power headroom is expressed as in Equation (1) below.

$$\text{Power Headroom} = P_{UE\ 102a\_max} - P_{UE\ 102a\_channel\ power} \quad (1)$$

If the power headroom is a positive value then the first transceiver 102a is able to transmit packets at higher Tx power. If the power headroom is a negative value then the first transceiver 102a is already transmitting at a maximum Tx power. If the PHR is positive, then the receiver 110 may allocate more resource blocks to the first transceiver 102a, but in the negative power headroom scenario it may presume that the first transceiver 102a is already using the maximum resource blocks and need not assign more. Thus, the PHR at the first transceiver 102a is at maximum power constraint only.

Unlike the PHR (as in Equation (1) above), the PHR may consider an EMR value and then calculate the PHR, as shown in Equation (2) as follows.

$$\text{Power Headroom} = P^{SAR\_opt} - P_{UL\_channel\_power} \quad (2)$$

The $P^{SAR\_opt}$ defines the maximum optimal power available at the first transceiver 102a after EMR measurement to keep the transmission lower than EMR limits.

FIG. 7A illustrates a transceiver regulating transmission of a packet from the first transceiver 102a by adjusting a spatial direction of one or more antenna(s) based on proximity levels, according to an embodiment of the present disclosure. A receiver (where the receiver may be, for example, the second transceiver(s) (102b, 102c and 102n of FIG. 1)) may measure EMR and transmit feedback to the first transceiver 102a. The first transceiver 102a may be configured to change beam phase and allocated power to minimize EMR at the first transceiver 102a. Thus, in order to allocate power, the transmitted direction should maximize the capacity within the EMR constraints (i.e., an EMR threshold), such that the receiver 110 should not experience EMR above the EMR threshold and yet achieve optimal capacity.

EMR is minimized at the first transceiver 102a, wherein the transmit power ensures that the first transceiver 102a does not experience EMR above an EMR threshold, and yet provide optimize capacity at the receiver 110. The $P^{SAR\_opt}$ is the power threshold driven based on the measured EMR.

Further, the control unit 202 may be configured to regulate transmission of packets by adjusting spatial direction for analog beam forming with an antenna array as shown in FIG. 7B. For a single antenna system, a phase shifter may be used to change a direction of the Tx beam former, in order to regulate a measured EMR. For an N-antenna UL beam former, where each antenna transmits the same waveform with a phase difference, the beam former may be expressed as an N-dimensional vector as in Equation (3) as follows:

$$W_{\theta i} = 1/\sqrt{N}[1, e\theta_i], \quad (3)$$

where $1/\sqrt{N}$ divides power among all transmit antennas for the system as Y=HWx+n.

"x" denotes a data symbol with an expected value, E [x $x^H$]<=P, where P is total transmit power. If the first transceiver 102a detects that a measured EMR is greater than the EMR_IDX (achieved by quantizing the measured EMR), then the control unit 202 may transmit symbol "x", with beam forming vector F(θ), and iteratively find θopt, for ∀ θ=1 . . . N, and measure θopt, where measured EMR is minimum.

Further, the control unit 202 may adjust the spatial direction for multiple-input and multiple-output (MIMO) with digital pre coder as shown in FIG. 8.

In FIG. 8, a transceiver with M transmit antennas and a receiver (where the receiver may be, for example, a second transceiver or BS) with N receiver antennas are considered. A channel H may be represented by an N*M matrix H of channel gains $h_{ij}$ representing a gain from transmit antenna "j" to a receiver antenna i.e., the N*1 received signal "y" is equal to y=Hx+n, where "x" is the M*1 transmitted vector and "n" is the N*1 additive white complex Gaussian noise vector 2, normalized so as that its covariance matrix is the identity matrix.

The first transceiver 102a may be subject to an average power constraint of P across all transmit antennas, i.e., E[$x^H$ x]≤P. Since the noise power is normalized to unity, the power constraint P is commonly referred to as the signal to noise ratio (SNR). If the channel is constant and known perfectly at the first transceiver 102a and the receiver 110, the capacity (maximum mutual information) is as expressed in Equation (4) as follows, $$C = \text{Max det} \log_2(I_N + HQH^H) Q : Tr(Q) = P \quad (4)$$

The optimization is over the input covariance matrix Q, which is M*M and must be positive semi-definite by definition. Using the singular value decomposition (SVD) of the M*N matrix H, this channel may be converted into min(M, N) parallel, non-interfering channels.

The SVD allows H to be rewritten as $H=U\Sigma V^H$, where U is M*M and unitary, V is N*N and unitary, and Σ is M*N and diagonal with non-negative entries. The diagonal elements of the matrix Σ, denoted by σi, are the singular values of H and may be in descending order (σ1>σ2 . . . $\sigma_{min}$≥(M, N)). Because the parallel channels are of different quality, water filling instructions may be used to optimally power over the parallel channels leading to the following allocation in Equation (5) as follows, $$Pi = \left(\mu - \frac{1}{\sigma_i^2}\right) \text{ where } 1 <= i <= R^H, \quad (5)$$

where $R^H$ defined as the rank of decomposed channel.

$P_i$ is the power on x input vector along the eigen vector of a channel, water fill level "μ" is chosen such that $\Sigma_i^{RH} P_i = P$. Capacity is achieved by choosing each component "x" according to an independent Gaussian distribution with power $P_i$. The covariance matrix which achieves the maximum (in the covariance matrix of the capacity-achieving inputs) is $Q=VPV^H$, where the M*M matrix P is defined as P=diag(P1, . . . $P_R^H$ 0, . . . 0). For the optimal pre-coder, power constraints are defined as maximize "V" is subjected to Tr(Q)<P while, with the measured EMR, transmit power will be constrained by EMR. Maximize V subjected to Tr(Q)$P^{EMR\_opt}$.

In MIMO, EMR may be handling per layer or a subset of layers. A subset of transmission layer may be controlled to keep EMR minimal Thus, an optimal power per layer pre-coder may be written as a maximize V subjected to constraints in Equation (6) as follows:

A) $P^{EMR\_opt} => (\Sigma_{i=0}^{RH-n} Q_{ii} + \Sigma_{i=RH-n+1}^{RH} Q'_{ii}$, wherein the $Q'_{ii} \forall I$;

$$P_i = \left(\mu - \frac{1}{\sigma_i^2}\right)$$

and the waterfall μ is chosen such that power applied on the transmission eigenvector (V) should keep the summed power less than $P^{EMR\_opt}$.

B) To bring per layer control, especially applicable for multiuser MIMO, the EMR constraints should be maintained on the allocated eigen directions to the receiver.

$$P^{EMRopt,um} => \Sigma_{i=0}^{Rum-n} Q_{ii} + \Sigma_{i=Rum-n+1}^{Rum} Q'_{ii} R^H = \Sigma_{x=1}^{x=m} R^{ux}$$

where, rank of matrix should be equal to summation of rank allocated to all users $$P = P^{EMRopt.U1} + \ldots + P^{EMRopt.Um}). \quad (6)$$

In MIMO, EMR may be regulated per layer or a subset of layers. Thus, according to the present disclosure power is allocated on transmit eigen direction as per the water filling instructions (as shown in FIGS. 9A-9B). In order to make the transmission EMR constraints, the proposed mechanism provides additional constraint on a weak eigen direction, so that optimal capacity may be achieved for a given EMR threshold. Allocating optimal power on a strong eigen direction will result in optimal capacity, however a weak eigen direction may be comprised to satisfy EMR constraints.

Figure 10A:
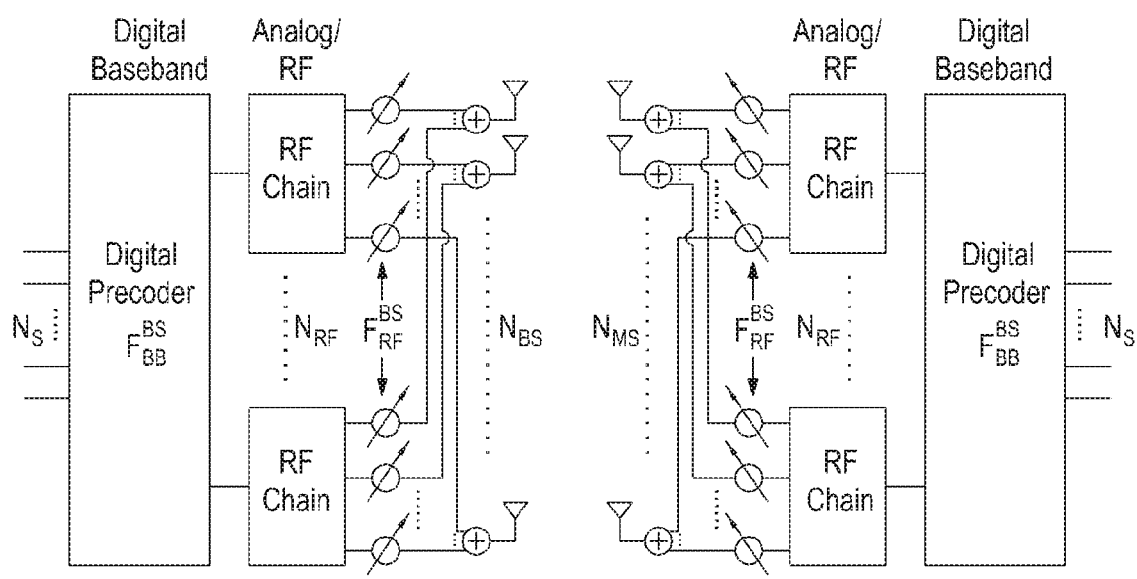
FIGS. 10A and 10B are each a block diagram of a transceiver regulating transmission of a packet by adjusting a spatial direction and applied power for MIMO with a hybrid pre-coder using multiple RF chains, according to an embodiment of the present disclosure.

The control unit according to an embodiment of the present disclosure may be configured to adjust spatial direction for MIMO with a hybrid (analog and digital) pre-coder, as shown in FIG. 10A. A EMR effect is higher in a beam form based system.

In FIG. 10A, a first transceiver with $N_{BS}$ transmit antennas and $N_{RF}$ chains is considered. The first transceiver is communicating with a second transceiver(s) 102b having $N_{MS}$ transmit antennas 1010 (or receive antennas) and $N_{RF}$ chains 1012. A channel H may be represented by an $N_{MS}*N_{BS}$ matrix H of channel gains $h_{ij}$ representing a gain from transmit antenna "J" to receive antenna "i". $N_s$ data streams may be transmitted to the second transceiver or a receiver such that a rank $R^H$ is min($N_{RF}$, $N_{BS}$, $N_{MS}$).

At the first transceiver 102a, the transmitting vectors ($N_s*1$) may be multiplied by an $N_{RF}*N_s$ digital pre coder $F_{bb}^{BS}$ followed by an $N_{BS}*N_{RF}$ pre-coder $F_{RF}^{BS}$, where "x" is an $N_{BS}*1$ transmitted vector, normalized so that its covariance matrix is the identity matrix, such as in Equation (7) as follows:

$$x = F_{RF}^{BS} F_{bb}^{BS} s \quad (7)$$

$F_{RF}^{BS}$ is implemented as an analog shifter and all of its entries are of some norm. The total power constraints is enforced as in Equation (8) as follows:

$$tr(F_{RF}^{BS} F_{bb}^{BS} P(F_{RF}^{BS} F_{bb}^{BS})^H) = P \quad (8),$$

where P is an $N_s*N_s$ matrix defined as $P = \text{diag}(P1 \ldots PR^H, 0, \ldots 0)$.

The "P" is power limited due to the EMR (i.e., SAR) constraint and $P^{EMR\_opt}$ (i.e., $P^{SAR\_opt}$) is the optimal power to control EMR for the user. Received symbols, after equalization at the receiver may be expressed as in Equation (9) as follows:

$$y = y = \sqrt{P}(F_{RF}^{MS} F_{bb}^{MS})^H H F_{RF}^{BS} x + (F_{RF}^{MS} F_{bb}^{MS})^H w \quad (9).$$

$C_{hyb}$ is the capacity with optimal hybrid precoder at the transceiver as expressed in Equation (10) as follows:

$$C_{hyb} = \max_{Q_{hyb}: tr(Q_{hyb}) = P} \log_2 \det(I_N + HQ_{hyb} H^H), \quad (10)$$

where $Q_{hyb}$ is the input covariance matrix to achieve capacity and is defined as in Equation (11) as follows:

$$Q_{hyb} = F_{RF}^{BS} F_{bb}^{BS} P(F_{RF}^{BS} F_{bb}^{BS})^H \quad (11).$$

In a single user hybrid beam forming setup, a transmission layer must adjust applied power for the user to minimize EMR. The optimal pre coder ($F_{RF}^{BS} F_{bb}^{BS}$) is subjected to constraint as in Equation (12) as follows:

$$P^{EMR\_opt} \geq (Q_{hyb,ii} + \Sigma_{i=1}^{R^H-n} Q_{hyb,ii} + \Sigma_{i=R^H-n+1}^{R^H} Q'_{hyb,ii} \quad (12)$$

$Q_{hyb,ii}$ should follow water filling instructions to apply power on each transmission eigen vector and $Q'_{hyb,ii} \forall i$; should have $$P'_{hyb,i} = \left(\mu' - \frac{1}{\sigma_i^2}\right) \text{ as per}. \quad (13)$$

The water fill level μ' is chosen such that power applied on the transmission eigen vector ($F_{RF}^{BS} F_{bb}^{BS}$) should keep the total power less than $P^{EMR\_opt}$. "n" is chosen such that EMR reaches the $EMR_{NORM}$ level.

Figure 10B:
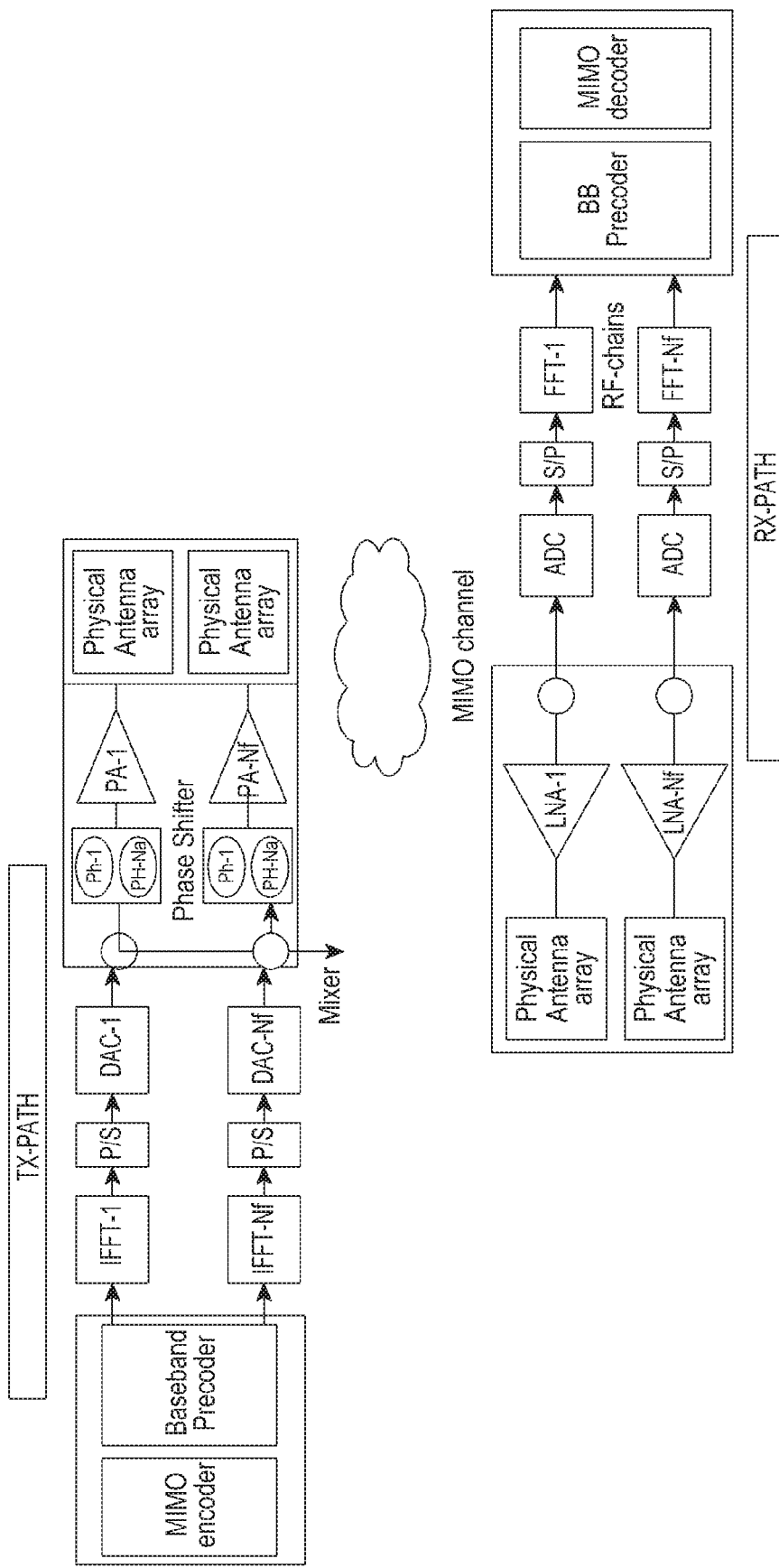

Referring to the FIG. 10B, the hybrid pre coder with sub antenna array partition is described with a complete transceiver chain. The transceiver at Tx consists of a MIMO encoder and a baseband pre coder to transmit symbols on each antenna subarray as an RF chain. Symbols are transformed in the time domain using an inverse fast Fourier transform (IFFT), which is connected to each RF chain through a parallel to serial converter. Symbols are further passed through an individual phase shifter for the RF chain, a digital-to-analog converter (DAC), low pass filters and a power amplifier (PA) and transmitted though physical antenna subarrays. Physical antenna subarrays are designed by a total $N_f$ number of physical antennas, which are partitioned into an $N_t$ sub array, where each array is of size $N_a$. At the receiver, symbols are received at each antenna sub array and passed through an RF chain specific low noise amplifier (LNA) and further processed through an IFFT for baseband and MIMO decoder processing.

For MIMO with a hybrid (analog and digital) pre coder-multiple RF chains, multiple independent RF chains linking array antennas form from an end chain, as shown in FIG. 10B. In this case, the beam is controlled with a front end chain. Each RF front end chain has a PA, and power is independently applied on each beam. For a given system where there are $N_t$ independent RF chains, power applied on each beam is as expressed in Equation (14) as follows:

$$P_{beam,i} \forall i \text{ where } i = 1 \ldots N_t. \quad (14)$$

$P_{beam} < P^{EMR\_opt} \forall I$ where $i = 1 \ldots N_t$ multi user beams are formed and $\Sigma_{j=0}^{Nt} P_{beam}$, $j < P \forall I$ where $j = 1 \ldots N^{t'}$ are a number of beams served to the user.

Further, a spatial direction may be adjusted for a UL transmission based on proximity levels. The water filling instructions provide optimal power allocation per hybrid eigen direction, thus according to the present disclosure the power with EMR constraints for those eigen directions which are relatively weaker, so that an optimal capacity may be achieved with SAR constraints. The "n" may be chosen such that the EMR constraints may be applied from the weak hybrid eigen direction to the best eigen direction until the EMR has reached the EMR OPT level. For the multi user hybrid MIMO system, wherein each user is served by a set of eigen directions, the power allocated on those eigen directions should satisfy the EMR constraints independently.

Furthermore, the multiple independent RF chain linking array antennas form a front end chain. In this case, each beam is controlled by the EMR constraints so that each beam associated within the RF chain follows the $P^{EMR\_opt}$ to control the EMR on each beam.

Figure 11:
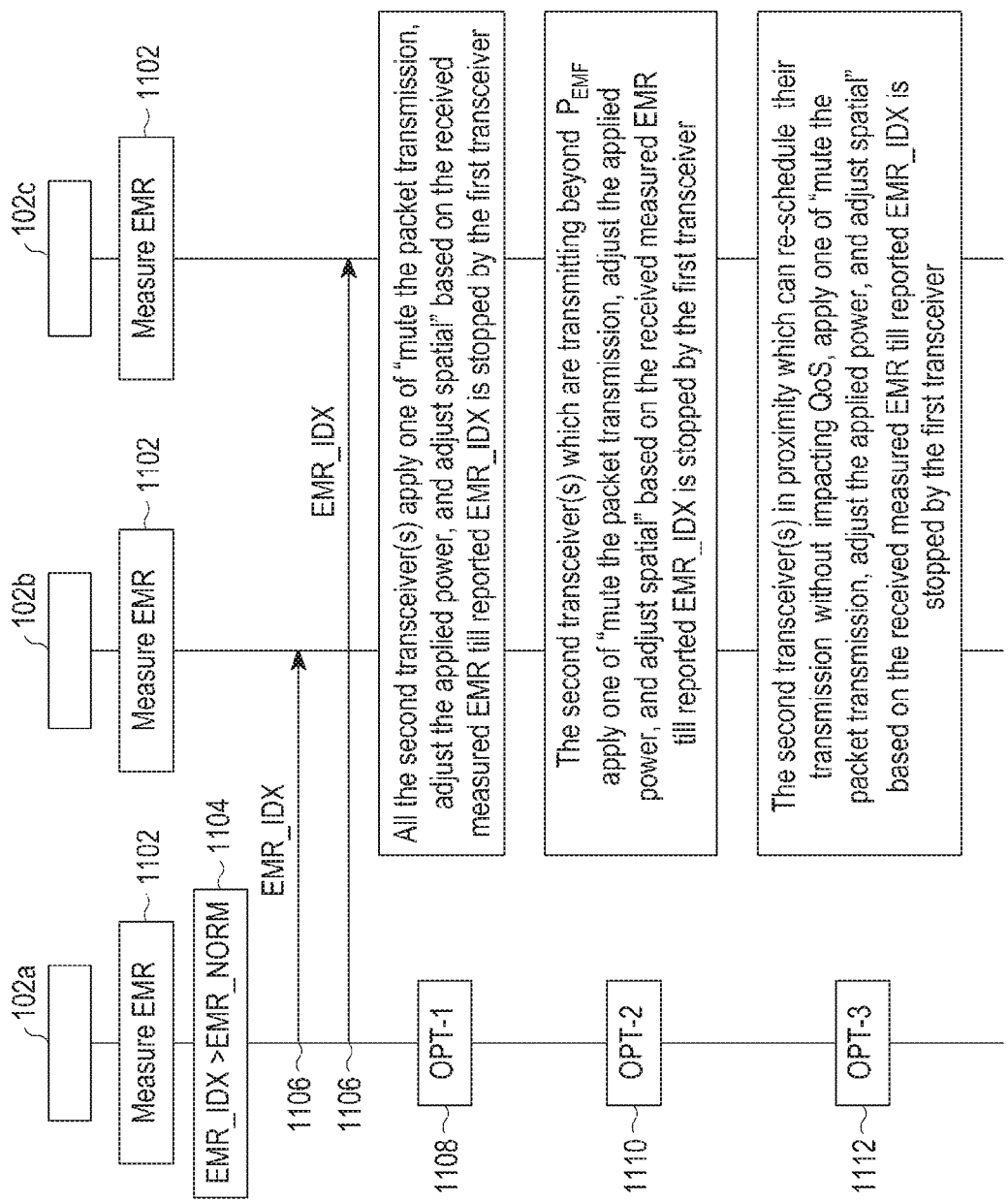
FIG. 11 is a sequence diagram for regulating transmission of a packet from a second transceiver(s) based on a plurality of EMR indexes received from a first transceiver, according to an embodiment of the present disclosure.

FIG. 11 is a sequence diagram 1100 for regulating transmission of a packet from a first transceiver, and second transceiver(s) 102b, 102c based on a plurality of EMR_IDXs received from the first transceiver 102a, according to an embodiment of the present disclosure. The receiver may be, for example, a BS.

Referring to FIG. 11, the first transceiver 102a and the second transceiver(s) 102b, 102c measure at steps 1102a, 1102b, 1102c EMR during transmission of packets. The first transceiver 102a determines at step 1104 that EMR_IDX exceeds EMR_NORM (i.e., an EMR threshold). The first transceiver 102a at steps 1106a, 1106b broadcasts the EMR_IDX to the second transceiver(s) 102b and 102c.

Further, the second transceiver(s) 102b, 102c based on the EMR_IDX received from the first transceiver 102a may be configured to perform at step 1108 the instructions provided in OPT-1, wherein, the second transceiver(s) (102b and 102c) regulate the transmission of the packet to minimise EMR by applying one of "muting the packet transmission, adjusting the applied power, and further adjusting the spatial direction of the one or more antennas" based on the received measured EMR until the reported EMR_IDX from the first transceiver 102a is terminated.

Further, the second transceiver(s) 102b, 102c based on the EMR_IDX received from the first transceiver 102a is configured to perform at step 1110 the instructions provided in OPT-2, wherein, the second transceiver(s) 102b, 102c which are transmitting beyond $P_{EMR}$ (i.e., the EMR threshold) regulate transmission of a packet to minimize EMR by applying one of "muting the packet transmission, adjusting the applied power, and further adjusting the spatial direction of the one or more antennas" based on the received measured EMR until the reported EMR_IDX from the first transceiver 102a is terminated.

Furthermore, the second transceiver(s) 102b, 102c based on the EMR_IDX received from the first transceiver 102a is configured to perform at step 1112 the instructions provided in OPT-3, wherein, the second transceiver(s) 102b, 102c may re-schedule the transmission of the packet without impacting quality of service (QoS) and may regulate the transmission of the packet to minimize the EMR by applying one of "muting the packet transmission, adjusting the applied power, and further adjusting the spatial direction of the one or more antennas" based on the received measured EMR until the reported EMR_IDX from the first transceiver 102a is terminated.

Further, an embodiment of the present disclosure includes minimization of the EMR by the first transceiver 102a in coordination with the receiver 110. The receiver 110 receives the EMR_IDX from the first transceiver 102a and the second transceiver(s) 102b, 102c, based on the received EMR_IDX from the receiver 110, can allocate the UL/downlink (DL) resources for the second transceiver(s) 102b, 102c to minimize the EMR. The resources may include time, frequency, space or the like.

Furthermore, the first transceiver 102a measures the EMR (SAR) information between <1 W/kg and 1.2 W/kg to 1.6 W/Kg, which can be quantized as low, medium and high. The EMR measured is sent to the receiver 110 on a common uplink control channel or on an uplink data channel, if a common UL grant is available. The receiver 110 receives the EMR information from the first transceiver 102a. According to an embodiment of the present disclosure, the receiver 110 allocates physical resources in such a way so that the first transceiver 102a and the second transceiver(s) 102b, 102c should not measure the EMR above the EMR threshold.

While allocating resources in DL, the receiver 110 may consider the EMR_IDX received from the first transceiver 102a and the second transceiver(s) 102b, 102c as an additional parameter, wherein, for a given channel quality indicator (CQI), the receiver 110 may allocate resources in time/frequency/space for a scheduled modulation and coding scheme (MCS). However, to control the EMR in the DL, the receiver 110 may allocate the resources to minimize the EMR at the first transceiver 102a and at the second transceiver(s) 102b, 102c.

For a DL allocation MCS (F1, T1, S1)=BS 110_Sche (CQI, load, other), as per the adjusted spatial direction of the one or more antennas to have the EMR constraints MCS (F1, T1, S1)=receiver 110_Sche (CQI, load, others, EMR_IDX) as per one of muting the packet transmission, adjusting the applied power, and further adjusting the spatial direction of the one or more antennas to minimize the EMR.

Figure 12:
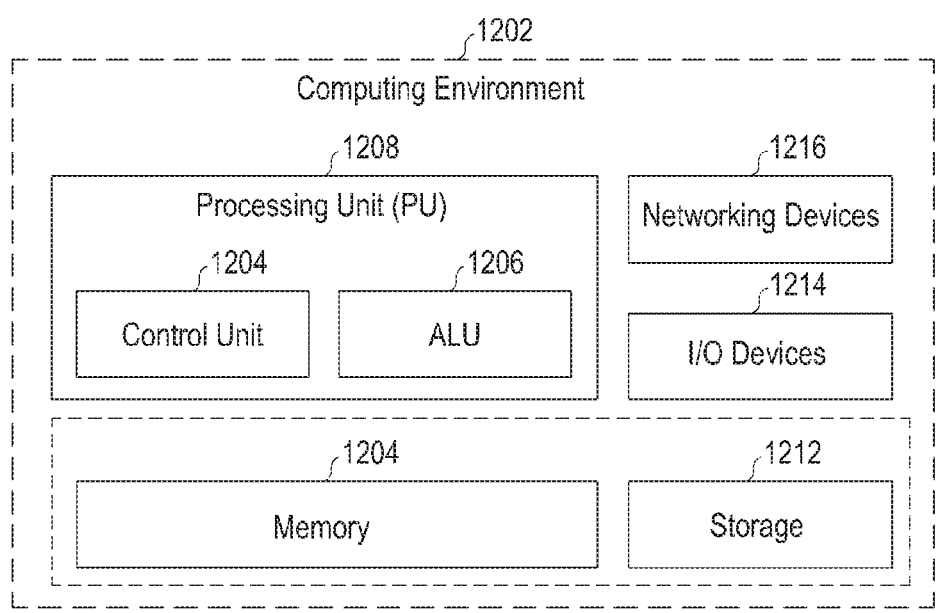
FIG. 12 is a block diagram of a computing environment implementing a method of regulating a transmission of a packet from a transceiver, according to an embodiment of the present disclosure.

FIG. 12 is a block diagram of a computing environment 1202 implementing a method of regulating transmission of a packet from the first transceiver 102a and the second transceiver(s) 102b, 102c and 102n, according to an embodiment of the present disclosure.

Referring to FIG. 12, the computing environment 1202 includes at least one processing unit 1208 that is equipped with a control unit 1204 and an arithmetic logic unit (ALU) 1206, a memory 1210, a storage 1212, a plurality of networking devices 1216 and a plurality input/output (I/O) devices 1214. The processing unit 1208 is responsible for processing instructions of schemes. The processing unit 1208 receives commands from the control unit 1204 in order to perform its processing. Further, any logical and arithmetic operations involved in the execution of the instructions are computed with the assistance of the ALU 1206.

The overall computing environment 1202 may be composed of multiple homogeneous or heterogeneous cores, multiple central processing units (CPUs) of different kinds, special media and other accelerators. The processing unit 1208 is responsible for processing instructions of schemes. Further, the processing unit 1208 may be located on a single integrated circuit, or chip, or over multiple chips.

A scheme including instructions and code required for implementation are stored in either the memory 1210 or the storage 1212 or both. At the time of execution, instructions may be fetched from the corresponding memory 1210 or storage 1212 and executed by the processing unit 1208.

In case of any hardware implementations, various networking devices 1216 or I/O devices 1214 may be connected to the computing environment 1202 to support the implementation through the networking devices 1216 and the I/O devices 1214.

The embodiments disclosed herein may be implemented through at least one software program running on at least one hardware device and performing network management functions to control the elements. The elements shown in the FIGS. 1 through 12 include blocks which may be at least one of a hardware device, or a combination of a hardware device and software units.

The foregoing description of embodiments of the present disclosure so fully reveals the general nature of the embodiments herein that others may, by applying current knowledge, readily modify or adapt for various applications such embodiments without departing from the concept, and, therefore, such adaptations and modifications are intended to be comprehended within the meaning and range of equivalents of the disclosed embodiments. It is to be understood that the terminology employed herein is for the purpose of description and not of limitation. Therefore, those skilled in the art will recognize that the embodiments herein may be practiced with modification within the scope of the present disclosure, as defined by the appended claims and their equivalents.

What is claimed is:

1. A method of regulating transmission of a packet from a transceiver, the method comprising:
   measuring, by the transceiver, electronic magnetic radiation (EMR) for an allocated uplink (UL) grant at a transmission time interval (TTI);
   detecting, by the transceiver, if the measured EMR exceeds an EMR threshold; and
   regulating, at the transceiver, a transmission of the packet to reduce the EMR,
   wherein regulating, at the transceiver, the transmission of the packet to reduce the EMR comprises:
   quantizing the measured EMR into a plurality of EMR indexes;
   determining a bundle size corresponding to at least one EMR index of the plurality of EMR indexes, wherein the bundle size is shared in association with an activation time to trigger a TTI bundling; and
   adjusting an applied power based on the bundle size for the transmission of the packet.

2. The method of claim 1, wherein regulating, at the transceiver, the transmission of the packet to reduce the EMR further comprises muting the transmission of the packet for an allocated UL grant for at least one TTI based on the measured EMR.

3. The method of claim 1, wherein regulating, at the transceiver, the transmission of the packet to reduce the EMR further comprises:
   adjusting an applied power based on the measured EMR; and
   transmitting the packet based on the adjusted applied power.

4. The method of claim 3, wherein adjusting the applied power based on the measured EMR comprises:
   quantizing the measured EMR into a plurality of EMR indexes; and
   adjusting the applied power corresponding to the at least one EMR index from the plurality of EMR indexes for transmitting the packet.

5. The method of claim 1, wherein regulating, at the transceiver, the transmission of the packet to reduce the EMR further comprises:
   adjusting a spatial direction of at least one antenna based on the at least one EMR index from the plurality of EMR indexes; and
   transmitting the packet based on the adjusted spatial direction of the at least one antenna.

6. The method of claim 5, wherein the spatial direction of the at least one antenna is adjusted using a phase shifter, wherein each of the at least one antenna transmits a same waveform with a phase difference.

7. The method of claim 5, wherein the spatial direction of the at least one antenna is adjusted for the EMR index based on a proximity level.

8. The method of claim 5, wherein adjusting the spatial direction of the at least one antenna based on the at least one EMR index from the plurality of EMR indexes comprises:
   determining a lower eigen direction from a plurality of eigen directions for the at least one EMR index from the plurality of EMR indexes; and
   adjusting a power allocation to the lower eigen direction.

9. The method of claim 1, wherein regulating, at the transceiver, the transmission of the packet to reduce the EMR further comprises:
   measuring, by the transceiver, a power head room (PHR) based on the at least one EMR index from the plurality of EMR indexes; and
   broadcasting, by the transceiver, a PHR measurement report.

10. A transceiver for regulating transmission of a packet, the transceiver comprising:
    a control unit; and
    a memory unit communicatively coupled to the control unit, wherein the control unit is configured to:
    measure an electronic magnetic radiation (EMR) for an allocated uplink (UL) grant at a transmission time interval (TTI);
    detect if the measured EMR exceeds an EMR threshold;
    regulate a transmission of the packet to reduce the EMR;
    quantize the measured EMR into a plurality of EMR indexes;
    determine a bundle size corresponding to at least one EMR from the plurality of EMR indexes, wherein the bundle size is shared in association with an activation time to trigger a TTI bundling; and
    adjust an applied power based on the bundle size for transmitting the packet.

11. The transceiver of claim 10, wherein the control unit is further configured to mute the packet transmission for an allocated UL grant for at least one TTI based on the measured EMR.

12. The transceiver of claim 10, wherein the control unit is further configured to:
    adjust the applied power based on the measured EMR; and
    transmit the packet based on the adjusted applied power.

13. The transceiver of claim 12, wherein adjusting the applied power based on the measured EMR comprises:
    quantizing the measured EMR into a plurality of EMR indexes; and
    adjusting the applied power corresponding to at least one EMR index from the plurality of EMR indexes for transmitting the packet.

14. The transceiver of claim 10, wherein regulating the transmission of the packet to reduce the EMR comprises:
    adjusting a spatial direction of at least one antenna based on the measured EMR; and
    transmitting the packet based on the adjusted spatial direction of the at least one antenna.

15. The transceiver of claim 14, wherein the spatial direction of the at least one antenna is adjusted using a phase shifter, wherein each of the at least one antenna transmits a same waveform with a phase difference.

16. The transceiver of claim 14, wherein the control unit is further configured to:

determine a lower eigen direction from a plurality of eigen directions for the at least one EMR index from the plurality of EMR indexes; and adjusting a power allocation to the lower eigen direction.

17. The transceiver of claim 10, wherein the control unit is further configured to:

measure, by the transceiver, a power head room (PHR) based on at least one EMR index from the plurality of EMR indexes; and transmit, by the transceiver, a PHR measurement report.

18. A computer program product comprising computer executable program code recorded on a non-transitory computer readable storage medium, said computer executable program code when executed causing a method comprising:

measuring an electronic magnetic radiation (EMR) for an allocated uplink (UL) grant at a transmission time interval (TTI);

detecting if the measured EMR exceeds an EMR threshold; and broadcasting the measured EMR to at least one second transceiver in proximity of a first transceiver to reduce the EMR, wherein the at least one second transceiver is configured to regulate a transmission of a packet to reduce the EMR by quantizing the measured EMR into a plurality of EMR indexes; determining a bundle size corresponding to at least one EMR index of the plurality of EMR indexes, wherein the bundle size is shared in association with an activation time to trigger a TTI bundling; and adjusting an applied power based on the bundle size for the transmission of the packet.

* * * * *